United States Patent
Gao et al.

(10) Patent No.: US 11,892,962 B2
(45) Date of Patent: Feb. 6, 2024

(54) GENZ PORT STRUCTURE

(71) Applicant: Lerain Technology Co., Ltd., New Taipei (TW)

(72) Inventors: Miaobin Gao, New Taipei (TW); Chia-Chi Hu, New Taipei (TW)

(73) Assignee: LeRain TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/950,782

(22) Filed: Sep. 22, 2022

(65) Prior Publication Data

US 2023/0385221 A1  Nov. 30, 2023

(30) Foreign Application Priority Data

May 25, 2022 (TW) .................................. 111119540

(51) Int. Cl.
*G06F 13/40* (2006.01)
*G06F 1/10* (2006.01)

(52) U.S. Cl.
CPC ............ *G06F 13/4063* (2013.01); *G06F 1/10* (2013.01)

(58) Field of Classification Search
CPC ............................... G06F 13/4063; G06F 1/10
See application file for complete search history.

(56) References Cited

U.S. PATENT DOCUMENTS

| 2019/0036257 A1* | 1/2019 | Lim ........................ G06F 13/40 |
| 2023/0195667 A1* | 6/2023 | Huang .................... G06F 13/36 710/305 |
| 2023/0229615 A1* | 7/2023 | Monti ................ G06F 13/4068 710/305 |

OTHER PUBLICATIONS

Zhao, Boyan et al. "Venice: An Effective Resource Sharing Architecture for Data Center Servers", Mar. 2019, ACM Transactions on Computer Systems, vol. 36, No. 1, Article 2, 26 pages (Year: 2019).*

* cited by examiner

*Primary Examiner* — Henry Tsai
*Assistant Examiner* — John B Roche
(74) *Attorney, Agent, or Firm* — MUNCY, GEISSLER, OLDS & LOWE, PC

(57) ABSTRACT

A GENZ port structure includes a body, a plurality of high-speed input pins, a plurality of high-speed output pins, a plurality of ground pins, a power supply pin, a plurality of differential clock pins, and a plurality of parameter setting pins. The main body includes a first side and a second side. The plurality of high-speed input pins are arranged on the first side. The plurality of high-speed output pins are arranged on the second side. The plurality of ground pins are interspersed between the plurality of high-speed input pins and the plurality of output pins. The power supply pins, the plurality of differential clock pins and the plurality of parameter setting pins are respectively arranged on one of the first side or the second side. The plurality of parameter setting pins are used to adjust an internal parameter setting of the GENZ port structure.

5 Claims, 4 Drawing Sheets

GENZ PORT STRUCTURE

BACKGROUND OF THE INVENTION

1. Field of the Invention

The present invention relates to a GENZ port structure, and particularly to a GENZ port structure that allows internal parameter setting and adjustment.

2. Description of the Related Art

Data communication and transmission rates are ever-increasing as technologies continue to progress. High-speed data transmission is demanded by both communication devices and data server devices. Currently, there is a new GENZ port having a smaller pitch and faster transfer speed than the previous one. The GENZ port can have 1C, 2C, or 4C specifications. However, in the prior art, the GENZ 1C has only 4 sets of high-speed transmission channels, so its use is greatly restricted. Furthermore, there may be errors in the processing of each cable, which will cause the cable not to meet customer requirements. In the prior art, the parameters of the cable with errors cannot be adjusted in the finished product stage to meet customer requirements. Therefore, it can only be screened in the final quality control stage to identify a bad GENZ port, which will lead to high costs and unsatisfactory production. In addition, the inability to adjust the parameters of the GENZ port restricts the ability of the port to provide good customized services.

Therefore, there is a need to provide a GENZ port structure for solving the issues of the prior art.

SUMMARY OF THE INVENTION

It is a primary object of the present invention to provide a GENZ port structure which allows internal parameter setting and adjustment.

To achieve the objects above, a GENZ port structure of the present invention includes a body, a plurality of high-speed input pins, a plurality of high-speed output pins, a plurality of ground pins, a power supply pin, a plurality of differential clock pins, and a plurality of parameter setting pins. The body comprises a first side and a second side, and the first side is side by side with the second side. The plurality of high-speed input pins are arranged at the first side. The plurality of high-speed output pins are arranged at the second side, wherein the plurality of high-speed input pins and the plurality of high-speed output pins are arranged symmetrically with one another. The plurality of ground pins are interspersed between the plurality of high-speed input pins and the plurality of high-speed output pins. The power supply pin is arranged at one of the first side or the second side. The plurality of differential clock pins are arranged at one of the first side or the second side. The plurality of parameter setting pins are arranged at one of the first side or the second side and used for adjusting an internal parameter setting of the GENZ port structure.

BRIEF DESCRIPTION OF THE DRAWINGS

All of the objects and advantages of the present invention will become apparent from the following description of the accompanying drawings, which disclose several embodiments of the present invention. It is to be understood that the drawings are to be used for purposes of illustration only, and not as a definition of the invention.

DETAILED DESCRIPTION OF THE PREFERRED EMBODIMENTS

Hereafter, the technical content of the present invention will be better understood with reference to preferred embodiments.

Figure 1:
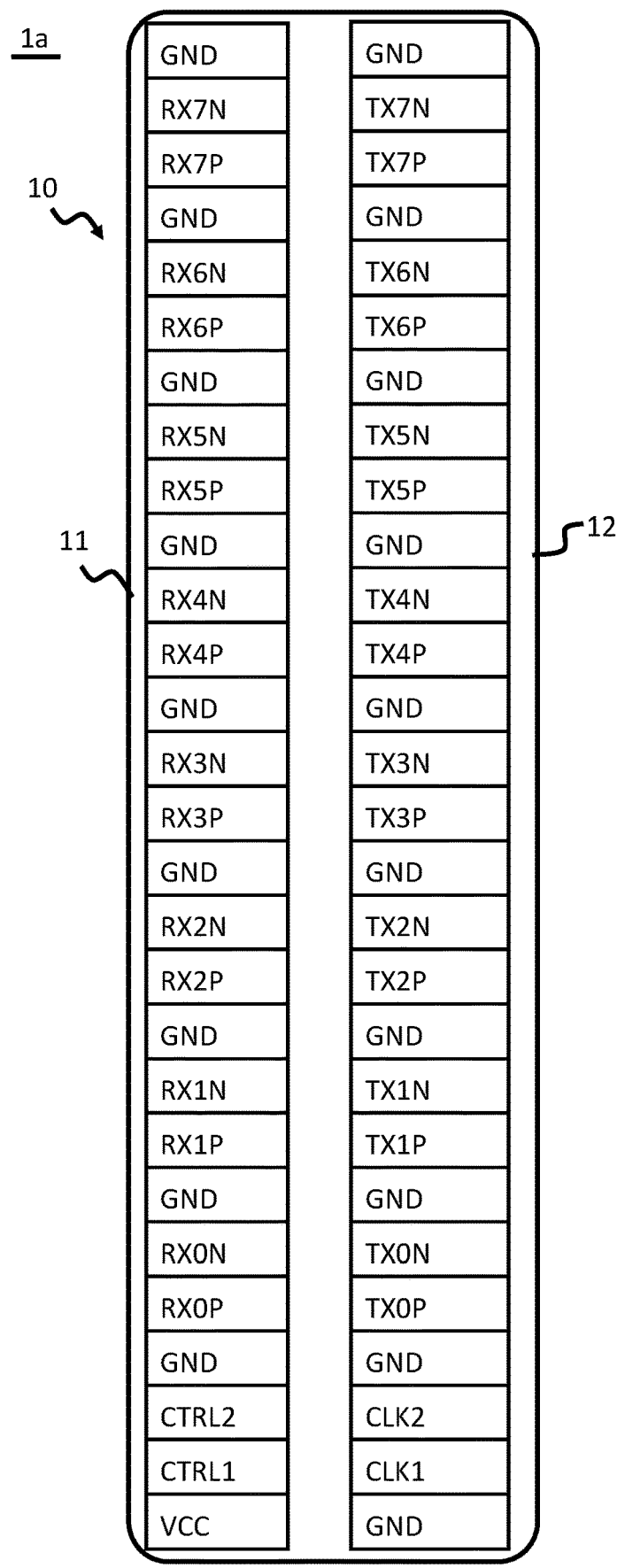
FIG. 1 illustrates a schematic drawing showing a pin configuration of a GENZ port structure according to the first embodiment of the present invention.

Please refer to FIG. 1, which illustrates a schematic drawing showing a pin configuration of a GENZ port structure according to the first embodiment of the present invention.

In the first embodiment of the present invention, the GENZ port structure 1a can be electrically connected with at least one other electronic module so as to transmit electronic signals. The electronic signal can be transmitted by, for example but not limited to, a signal-end signal or a differential signal. The embodiments of the present invention are described in the form of the differential signal. Please note that the terms "first" and "second" are used merely for describing elements of the present invention without limiting the scope of the elements. These terms are used only for differentiating one element from another. For example, without departing from the scope of the various embodiments of the present invention, the first input pin can be referred to as the second input pin, and similarly, the second input pin can be called the first input pin. The first input pin and the second input pin are both input pins and are not the same input pin.

In first embodiment of the present invention, the GENZ port structure 1a can be disposed on a circuit board and includes a body 10. The body 10 includes a first side 11 and a second side 12, and the first side 11 is side by side with the second side 12. In each embodiment of the present invention, the GENZ 1C specification is used as an example for description, but the present invention does not limit the pin settings in the GENZ port structure 1a only to use for the GENZ 1C specification. The GENZ port structure 1a is the GENZ 1C specification, so both the first side 11 and the second side 12 of the GENZ port structure 1a have 28 pins. These pins includes a plurality of high-speed input pins RX0P, RX0N, RX1P, RX1N, RX2P, RX2N, RX3P, RX3N, RX4P, RX4N, RX5P, RX5N, RX6P, RX6N, RX7P, RX7N, a plurality of high-speed output pins TX0P, TX0N, TX1P, TX6N, TX7P, TX7N, a plurality of ground pins GND, a power supply pin VCC, a plurality of differential clock pins CLK1, CLK2, and a plurality of parameter setting pins CTRL1, CTRL2.

The GENZ port structure 1a has eight sets of high-speed input pins RX0P, RX0N, RX1P, RX1N, RX2P, RX2N, RX3P, RX3N, RX4P, RX4N, RX5P, RX5N, RX6P, RX6N, RX7P, RX7N and eight sets of high-speed output pins TX0P, TX0N, TX1P, TX1N, TX2P, TX2N, TX3P, TX3N, TX4P, TX4N, TX5P, TX5N, TX6P, TX6N, TX7P, TX7N; therefore, the amount of data transmission can be increased. All of the plurality of high-speed input pins RX0P, RX0N, RX1P, RX1N, RX2P, RX2N, RX3P, RX3N, RX4P, RX4N, RX5P, RX5N, RX6P, RX6N, RX7P, RX7N are arranged at the first side 11, and all of the plurality of high-speed output pins TX0P, TX0N, TX1P, TX1N, TX2P, TX2N, TX3P, TX3N, TX4P, TX4N, TX5P, TX5N, TX6P, TX6N, TX7P, TX7N are arranged at the second side 12. In addition, each group of the plurality of high-speed input pins RX0P, RX0N, RX1P, RX1N, RX2P, RX2N, RX3P, RX3N, RX4P, RX4N, RX5P, RX5N, RX6P, RX6N, RX7P, RX7N and each group of the plurality of high-speed output pins TX0P, TX0N, TX1P, TX1N, TX2P, TX2N, TX3P, TX3N, TX4P, TX4N, TX5P, TX5N, TX6P, TX6N, TX7P, TX7N will have the ground pins GND for separation so as to avoid mutual interference between the various groups of high-speed signals. In this way, the above-mentioned plurality of high-speed input pins RX0P, RX0N, RX1P, RX1N, RX2P, RX2N, RX3P, RX3N, RX4P, RX4N, RX5P, RX5N, RX6P, RX6N, RX7P, RX7N and the plurality of high-speed output pins TX0P, TX0N, TX1P, TX1N, TX2P, TX2N, TX3P, TX3N, TX4P, TX4N, TX5P, TX5N, TX6P, TX6N, TX7P, TX7N are arranged symmetrically with one another.

The power supply pin VCC is arranged on the first side 11 for supplying a power signal. The plurality of differential clock pins CLK1, CLK2 are arranged on the second side 12 to provide differential clock signals. The plurality of parameter setting pins CTRL1, CTRL2 are arranged on the first side 11, and the plurality of parameter setting pins CTRL1, CTRL2 and the plurality of differential clock pins CLK1, CLK2 are symmetrically arranged on the first side 11 and the second side 12, respectively. As illustrated in FIG. 1, for example, the power supply pin VCC, the plurality of parameter setting pins CTRL1, CTRL2 and the plurality of differential clock pins CLK1, CLK2 of the GENZ port structure 1a are centrally arranged on the left end of the body 10, and the plurality of high-speed input pins RX0P, RX0N, RX1P, RX1N, RX2P, RX2N, RX3P, RX3N, RX4P, RX4N, RX5P, RX5N, RX6P, RX6N, RX7P, RX7N and the plurality of high-speed output pins TX0P, TX0N, TX1P, TX1N, TX2P, TX2N, TX3P, TX3N, TX4P, TX4N, TX5P, TX5N, TX6P, TX6N, TX7P, TX7N are centrally arranged on the right end of the body 10.

It should be noted that an engineer can use the plurality of parameter setting pins CTRL1, CTRL2 to adjust one of the internal parameter settings of the GENZ port structure 1a by modification of the firmware. This enables the GENZ port structure 1a to be adjusted to meet customer requirements after production by using the plurality of parameter setting pins CTRL1, CTRL2. In this way, the finished product of the GENZ port structure 1a can be manufactured in batches first, and then different parameters can be adjusted by using the plurality parameter setting pins CTRL1, CTRL2 according to the needs of different customers and different orders, which can reduce the occurrence of defective products.

Figure 2:
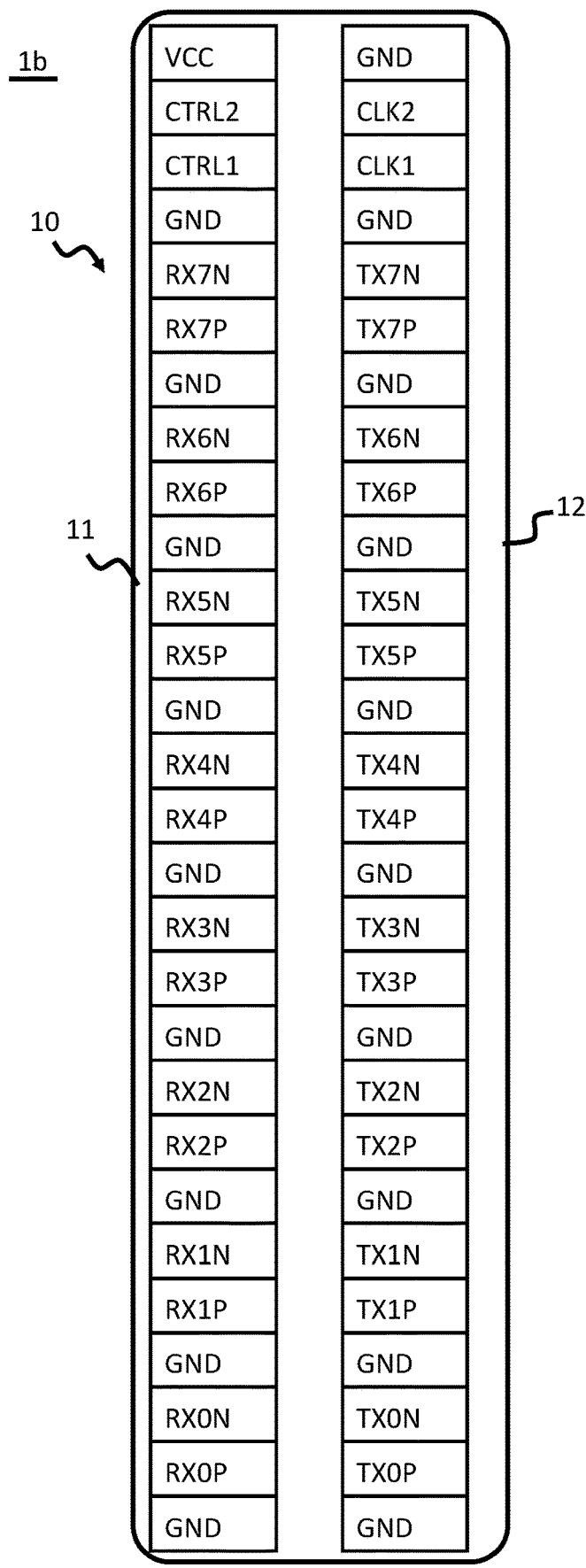
FIG. 2 illustrates a schematic drawing showing a pin configuration of the GENZ port structure according to the second embodiment of the present invention.

Now please refer to FIG. 2, which illustrates a schematic drawing showing a pin configuration of the GENZ port structure according to the second embodiment of the present invention.

Figure 3:
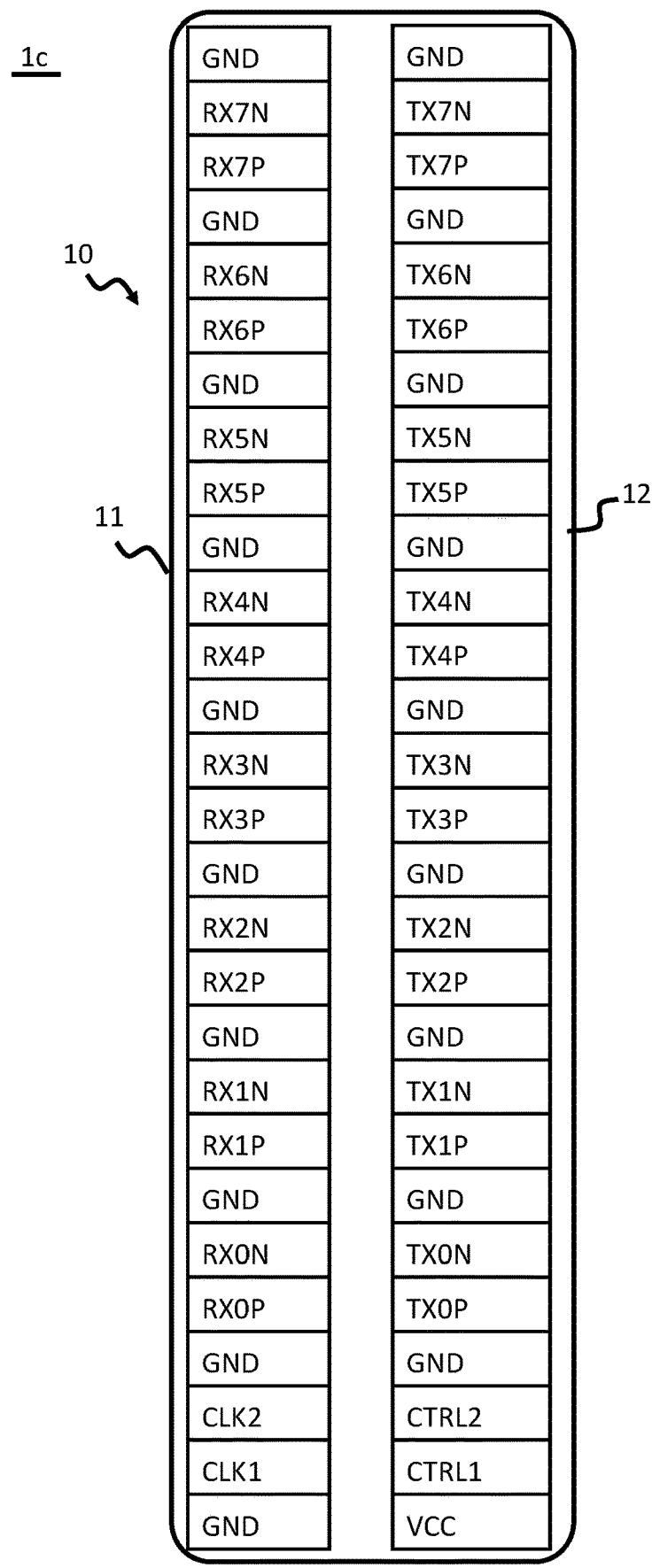
FIG. 3 illustrates a schematic drawing showing a pin configuration of the GENZ port structure according to the third embodiment of the present invention.
Figure 4:
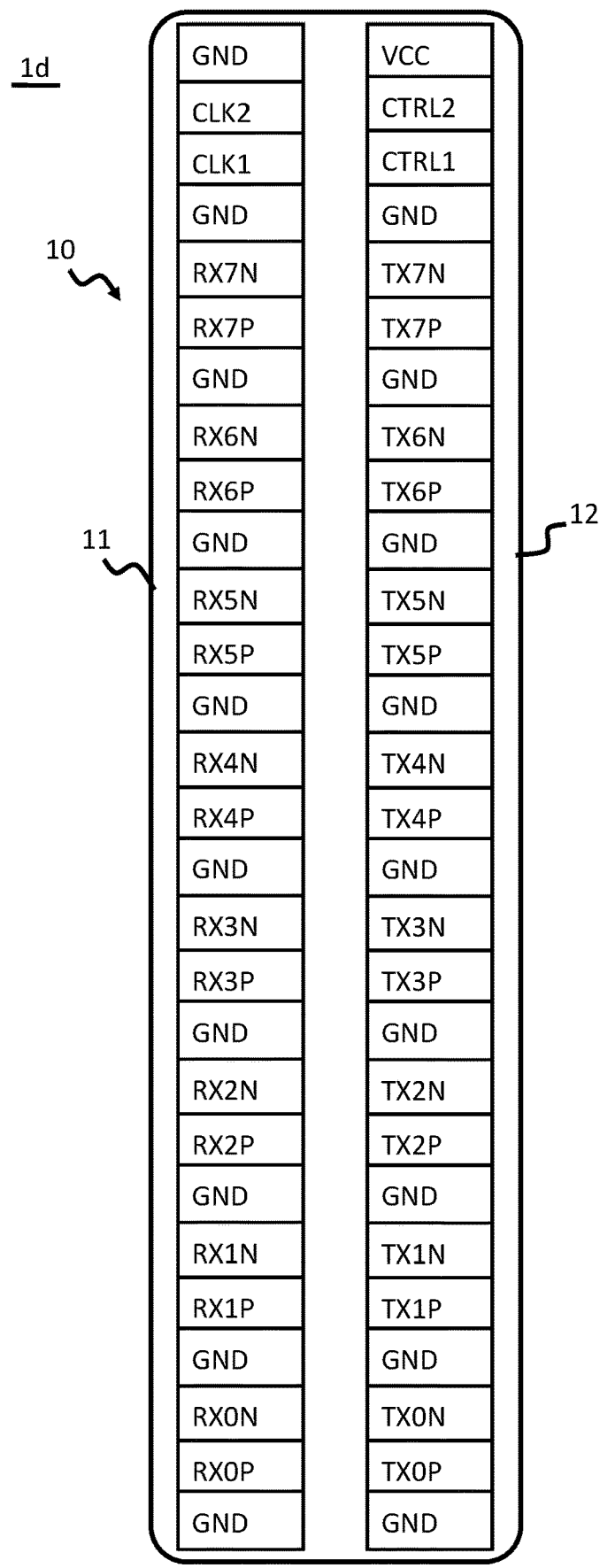
FIG. 4 illustrates a schematic drawing showing a pin configuration of the GENZ port structure according to the fourth embodiment of the present invention.

The GENZ port structure 1b, the GENZ port structure 1c described below (as shown in FIG. 3), or the GENZ port structure 1d described below (as shown in FIG. 4) has the same function as each pin of the GENZ port structure 1a, but the setting positions of the pins can be changed. In the second embodiment of the present invention, the power supply pin VCC, the plurality of parameter setting pins CTRL1, CTRL2 and the plurality of differential clock pins CLK1, CLK2 of the GENZ port structure 1b are centrally arranged on the right end of the body 10, and the plurality of high-speed input pins RX0P, RX0N, RX1P, RX1N, RX2P, RX2N, RX3P, RX3N, RX4P, RX4N, RX5P, RX5N, RX6P, RX6N, RX7P, RX7N and the plurality of high-speed output pins TX0P, TX0N, TX1P, TX1N, TX2P, TX2N, TX3P, TX3N, TX4P, TX4N, TX5P, TX5N, TX6P, TX6N, TX7P, TX7N are centrally arranged on the left end of the body 10. The power supply pin VCC and the plurality of parameter setting pins CTRL1, CTRL2 are arranged on the first side 11, and the plurality of differential clock pins CLK1, CLK2 are arranged on the second side 12.

Now please refer to FIG. 3, which illustrates a schematic drawing showing a pin configuration of the GENZ port structure according to the third embodiment of the present invention.

In the third embodiment of the present invention, the power supply pin VCC, the plurality of parameter setting pins CTRL1, CTRL2 and the plurality of differential clock pins CLK1, CLK2 of the GENZ port structure 1c are centrally arranged on the left end of the body 10, and the plurality of high-speed input pins RX0P, RX0N, RX1P, RX1N, RX2P, RX2N, RX3P, RX3N, RX4P, RX4N, RX5P, RX5N, RX6P, RX6N, RX7P, RX7N and the plurality of high-speed output pins TX0P, TX0N, TX1P, TX1N, TX2P, TX2N, TX3P, TX3N, TX4P, TX4N, TX5P, TX5N, TX6P, TX6N, TX7P, TX7N are centrally arranged on the right end of the body 10. The power supply pin VCC and the plurality of parameter setting pins CTRL1, CTRL2 are arranged on the second side 12, and the plurality of differential clock pins CLK1, CLK2 are arranged on the first side 11.

Finally, please refer to FIG. 4, which illustrates a schematic drawing showing a pin configuration of the GENZ port structure according to the fourth embodiment of the present invention.

In the fourth embodiment of the present invention, the power supply pin VCC, the plurality of parameter setting pins CTRL1, CTRL2 and the plurality of differential clock pins CLK1, CLK2 of the GENZ port structure 1d are centrally arranged on the right end of the body 10, and the plurality of high-speed input pins RX0P, RX0N, RX1P, RX1N, RX2P, RX2N, RX3P, RX3N, RX4P, RX4N, RX5P, RX5N, RX6P, RX6N, RX7P, RX7N and the plurality of high-speed output pins TX0P, TX0N, TX1P, TX1N, TX2P, TX2N, TX3P, TX3N, TX4P, TX4N, TX5P, TX5N, TX6P, TX6N, TX7P, TX7N are centrally arranged on the left end of the body 10. The power supply pin VCC and the plurality of parameter setting pins CTRL1, CTRL2 are arranged on the second side 12, and the plurality of differential clock pins CLK1, CLK2 are arranged on the first side 11.

It can be seen from the above description that the different types of pins in the GENZ port structures 1a to 1d of the present invention can be arranged and combined with one another, and all can achieve the technology of adjustment of the internal parameter setting by using the plurality of parameter setting pins CTRL1, CTRL2, which is obviously superior to the prior art.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A GENZ port structure, comprising:
a body, comprising a first side and a second side, wherein the first side is arranged side by side with the second side;
a plurality of high-speed input pins, arranged at the first side;
a plurality of high-speed output pins, arranged at the second side; wherein
the plurality of high-speed input pins and the plurality of high-speed output pins are arranged symmetrically with one another;
a plurality of ground pins, interspersed between the plurality of high-speed input pins and the plurality of high-speed output pins;
a power supply pin, arranged at one of the first side or the second side;
a plurality of differential clock pins, arranged at one of the first side or the second side; and
a plurality of parameter setting pins, arranged at one of the first side or the second side and used for adjusting an internal parameter setting of the GENZ port structure.

2. The GENZ port structure as claimed in claim 1, wherein the plurality of parameter setting pins and the plurality of differential clock pins are symmetrically arranged on the first side and the second side respectively.

3. The GENZ port structure as claimed in claim 2, wherein the power supply pin, the plurality of parameter setting pins, and the plurality of differential clock pins are collectively arranged at the same end of the body, and the plurality of high-speed input pins and the plurality of high-speed output pins are collectively arranged at the other end of the body.

4. The GENZ port structure as claimed in claim 1, wherein the plurality of parameter setting pins are used to adjust the internal parameter setting of the GENZ port structure by modifying a firmware.

5. The GENZ port structure as claimed in claim 1, wherein the GENZ port structure comprises eight sets each of the plurality of high-speed input pins and the plurality of high-speed output pins.

* * * * *